Figure 1A:
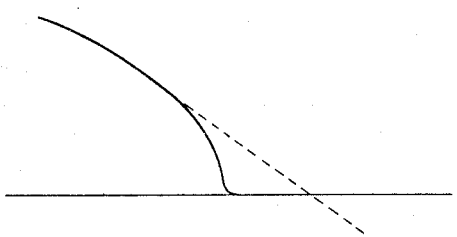

Inventors:
Raoul Willheim,
Gerhard Frühauf,
by Harry E. Dunham
Their Attorney.

Patented Jan. 4, 1938

2,104,629

UNITED STATES PATENT OFFICE 2,104,629

TESTING ARRANGEMENT FOR CIRCUIT-INTERRUPTING DEVICES

Raoul Willheim and Gerhard Frühauf, Berlin-Oberschoneweide, Germany, assignors to General Electric Company, a corporation of New York Application July 8, 1937, Serial No. 152,586
In Germany August 21, 1936

5 Claims. (Cl. 175—183)

Our invention relates to testing devices and concerns particularly methods and devices for testing circuit-interrupting devices at high apparent power on a low-power source.

It is an object of our invention to provide improved simply-operating apparatus for testing circuit breakers under conditions simulating the conditions of short-circuit at rated apparent power as they occur in actual operation.

It is a further object of our invention to test under like conditions other apparatus which is intended to interrupt an electrical circuit or in which by accident an electrical circuit may be interrupted.

It is an object of our invention to overcome the problem of synchronizing other independent circuit operations with the interruption time of a device being tested.

It is still another object of our invention to provide apparatus for automatically applying to a current-interrupting device a voltage surge simulating a recovery voltage transient at the instant when the current to be interrupted falls to zero.

It is a further object of our invention to make the operation of the apparatus independent of the magnitude of the current.

Other and further objects and advantages will become apparent as the description proceeds.

Owing to the large amounts of power involved in operation under actual conditions, it is desirable to test the interrupting capacity of large circuit breakers and to test the behavior of electrical circuits during interruption of heavy currents by providing a relatively low-voltage high-current generator and a separate relatively low-power high-voltage generator with suitable arrangements for applying the voltage of the high-voltage generator to the circuit breaker or at the point of interruption of the electrical circuit at the instant when the current of the high-current generator is interrupted. The difficulty of properly synchronizing the release of the high voltage with the interruption of the high current has heretofore interfered with the successful realization of such tests. Such tests as could be made have been of relatively little value in comparison with actual operating conditions under full power.

When a sinusoidal current is interrupted, owing to the formation of an arc before the actual cessation of current, the current wave departs from a true sine wave in the vicinity of the zero point of the cycle and falls to zero more rapidly than it would if it followed a true sine wave to the extinction of the current. In a pure sine wave, the first derivative of current with respect to time at the instant of zero current is a maximum but the change in magnitude of the first derivative is relatively gradual. On the other hand, when the current curve has a shape such as that just described owing to formation of an arc, as the current falls to zero, the first derivative of current with respect to time has a relatively abrupt peak and thereafter falls abruptly to zero. In consequence, the second derivative of current with respect to time not only has an abrupt peak but it has a sharp peaked reversal in magnitude at the instant when the current falls to zero. The fact that the second derivative of current with respect to time not merely has a sharp peak but the peak is of opposite polarity from the remainder of the curve representing the second derivative makes this phenomenon of particular value for positively and abuptly triggering a surge generator or other device for applying an auxiliary voltage to the circuit-interrupting device at the instant when the current falls to zero in order to simulate a recovery voltage transient. It will be understood that the "first derivative of current with respect to time" is the expression used in the branch of mathematics, known as the calculus, to represent the slope or steepness of a tangent to a curve representing current plotted against time, current valves being measured in a vertical direction and time being measured in a horizontal direction. Similarly, the "second derivative of current with respect to time" is the slope of a tangent to a curve representing the first derivative of current plotted with respect to time.

In carrying out our invention in its preferred form, we cause a voltage to be produced which is proportional to the second derivative of current with respect to time and the current flowing in a circuit to be interrupted, and we utilize this voltage for releasing a surge generator connected to a circuit-interrupting device or circuit being tested.

Figure 1B:
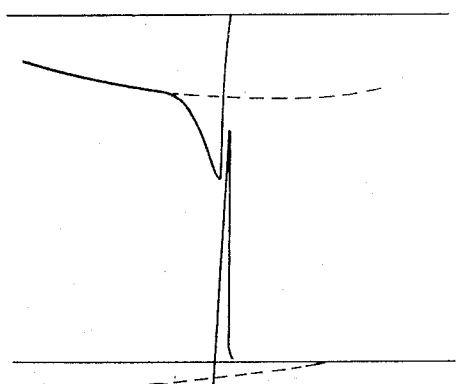
Figure 1C:
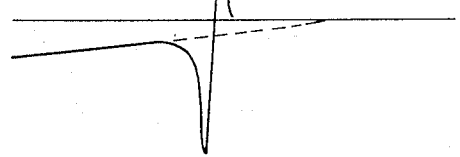

The invention may be understood more readily from the following detailed description when considered in connection with the accompanying drawing and those features of the invention which are believed to be novel and patentable will be pointed out in the claims appended hereto. In the drawing Fig. 1a is a graph representing the latter portion of the positive half of a cycle of current in an alternating-current circuit showing the course of a true sine wave by the dotted lines and the actual change of current by the full lines; Fig. 1b is a graph representing the first derivative of current with respect to time corresponding to the graph of Fig. 1a; Fig. 1c is a graph representing the second derivative of current with respect to time corresponding to the graphs of Figs. 1a and 1b; and Fig. 2 is a schematic circuit diagram illustrating an embodiment of my invention.

In Figs. 1a, 1b, and 1c, the time is plotted along the horizontal axis and the vertical distance from the horizontal axis represents the value of current in Fig. 1a, the value of the first derivative in Fig. 1b, and the value of the second derivative in Fig. 1c. The dotted portion of the curve represents the course which would be followed if the current were not interrupted and continued along the normal sine wave form. However, when the current is interrupted, an arc forms and the current begins to fall off more abruptly than the normal sine wave before the instant when the actual cessation of current takes place. In consequence, the actual instant of zero current occurs prior to the zero point on the sine wave.

It will be seen in Fig. 1b that, when the current wave begins to depart from the sine wave, the value of the first derivative increases abruptly in numerical value. Then, at the instant when the current reaches zero, the first derivative likewise changes very abruptly in value to zero. The second derivative of current as seen from Fig. 1c, which represents the slope of the curve of Fig. 1b, has a sharp negative peak prior to the instant of current interruption and then a very abrupt positive peak at the instant of current interruption. Since the positive peak is not only very sharp but of opposite polarity from the rest of the curve of Fig. 1c, a voltage having the shape of the curve of Fig. 1c is of particular value for positively and instantaneously releasing a surge generator.

Figure 2:
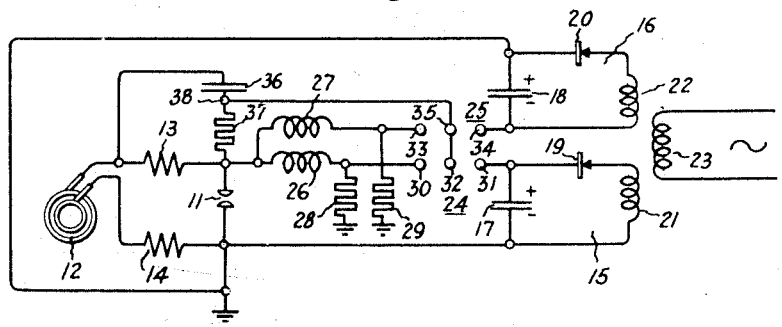

The manner of obtaining a voltage proportional to the second derivative of current is illustrated in Fig. 2. In Fig. 2, the circuit breaker or other device, the interrupting characteristics of which are to be tested, is shown at 11 and a source of alternating current 12 is connected to the circuit breaker 11 in series with inductors 13 and 14. It will be understood that the current source 12 may be such as to furnish the requisite current to simulate a short-circuit, a normal load current, or some other current at which the circuit-interrupting device 11 is intended to be tested but that the voltage and, consequently, the output of the source 12 may be relatively small.

In order to apply a voltage surge to the circuit-interrupting device 11, simulating a recovery voltage transient, one or more surge generators 15 and 16 are provided. In the arrangement shown, the two generators 15 and 16 of opposite polarity are provided in order that a voltage transient of the proper polarity will be available regardless of the polarity of the current upon interruption. It will be understood that surge generators of any suitable type may be employed and, if desired, the surge generators may take the simple form of condensers 17 and 18 connected through rectifiers 19 and 20 of a suitable type to relatively high-voltage sources 21 and 22, which may be secondary windings of a transformer having a primary winding 23 energized by an alternating-current source.

For the sake of safety, the circuit-interrupting device 11 may be grounded and the surge generators 15 and 16 are likewise grounded. A three-electrode gap 24 is interposed between the ungrounded sides of the circuit-interrupting device 11 and the surge generator 15 and similarly a three-electrode gap 25 is interposed between the ungrounded sides of the circuit-interrupting device 11 and the surge generator 16.

In order to guard against interaction between the surge generators 15 and 16 whereby the discharge of one generator might trip the other, inductance coils 26 and 27 are connected in series with the gaps 24 and 25, respectively, and high resistance grounding connections 28 and 29 are made to the generator sides of the inductances 26 and 27, respectively. The three-electrode gap 24 consists of an electrode 30 connected to the interrupting device, an electrode 31 connected to the surge generator, and a middle electrode 32. The three-electrode gap 25 likewise consists of end electrodes 33 and 34 and a middle electrode 35.

One of the inductors 13 has connected across it a condenser 36 and a resistor 37, the elements 36 and 37 being in series, with the resistor 37 connected to one side of the interrupting device 11. The terminal 38, common to the condenser 36 and the resistor 37, is connected to the middle electrodes 32 and 35 of the gaps 24 and 25.

As will now be explained, the voltage drop in the resistor 37 is proportional to the second derivative with respect to time of current in the circuit-interrupting device 11 and, upon the interruption of current in the device 11, a sharp voltage impulse is applied to the middle electrodes 32 and 35 to release the surge generator of proper polarity and apply a recovery voltage transient to the circuit-interrupting device 11.

The mathematical relationships are represented by the following equations:

$$V_L = L\frac{di_1}{dt}$$

$$i_2 = C\frac{dV_L}{dt} = CL\frac{d^2i_1}{dt^2}$$

$$V_R = RCL\frac{d^2i_1}{dt^2}$$

It is seen, therefore, that $V_R$ is a voltage proportional to the value $$\frac{d^2i_1}{dt^2}$$

In the foregoing equations the symbols are used with the following significance:

$V_L$ is the voltage occurring across the inductor 13.
$L$ is the inductance of the inductor 13.
$i_1$ is the instantaneous value of the short-circuit current, that is, the current to be interrupted by the device 11.
$t$ is the time.
$\frac{di_1}{dt}$ is the first derivative of the current $i_1$ with respect to time.
$i_2$ is the current flowing in the resistor 37.
$C$ is the capacity of the condenser 36.
$\frac{d^2i_1}{dt^2}$ is the second derivative of the current $i_1$, with respect to time.
$V_R$ is the voltage drop in the resistor 37.
$R$ is the resistance of the resistor 37.

Disregarding the surge generator 15 and assuming that the current to be interrupted is of such polarity as to require the surge generator 16 to be used for producing the recovery voltage transient, the operation of the apparatus is as follows:

At the instant of interruption of current by the device 11, a sharp positive peak of voltage proportional to $$\frac{d^2i}{dt^2}$$

is applied to the middle electrode 35, causing the potential difference between the electrodes 35 and 34 to become so great that the gap breaks down. The potential difference between the electrodes 33 and 35 thereupon becomes great enough to break down this gap and a discharge of the condenser 18 takes place across the entire gap 25, applying the recovery voltage transient to the interrupting device 11. The voltage wave applied to the middle electrode rises so abruptly that the gap breaks down at the instant when the current in the breaker becomes zero. Variations in the magnitude of the current, or of its first and second derivatives with respect to time cannot produce variations in the time at which the voltage applied to the gap becomes great enough to break it down. It will be understood, of course, that, if the current interrupted had been of the opposite polarity, the voltage peak on the middle electrodes of the gaps would have been of the opposite polarity and the other surge generator of opposite polarity would have been released.

The spacing between the electrodes of the three-electrode gaps is so chosen that the potential of the condenser 18 alone is insufficient to break down the gap between the electrodes 34 and 35 and the potential occurring across the resistor 37 alone is insufficient to break down the gap between the electrodes 33 and 35. However, when the voltage of the resistor 37 is added to that of the condenser 18 when applied between the electrodes 34 and 35, the resultant voltage is sufficient to break down this part of the gap and, consequently, to break down the entire gap and release the surge generator.

In accordance with the provisions of the patent statutes, we have described the principle of operation of my invention together with the apparatus which we now consider to represent the best embodiment thereof but we desire to have it understood that the apparatus shown is only illustrative and that the invention may be carried out by other means.

What we claim as new and desire to secure by Letters Patent of the United States is:—

1. Apparatus for testing circuit-interrupting devices comprising in combination a supply circuit for current to be interrupted by an interrupting device under test, an inductive impedance included in said circuit, a condenser and a resistor connected in series across said inductive impedance, a surge generator, and connections including a three-electrode spark gap between said generator and said circuit, said gap having its middle electrode connected to the common point of said condenser and said resistor.

2. Apparatus for testing circuit-interrupting devices comprising in combination, a pair of terminals to which electrodes of a circuit-interrupting device are adapted to be connected, a source of current to be interrupted by an interrupting device under test, an inductive impedance connected in series with said source and said terminals, a condenser having a terminal connected between said source and said inductive impedance and having a second terminal, a resistor having a terminal connected to the one of said testing terminals common to said inductive impedance and having a second terminal, a surge generator having output terminals, one of which is connected to one of said testing terminals, and a gap having three electrodes including an end electrode connected to the remaining output terminal of said generator, a second end electrode connected to said testing terminal common to said inductive impedance and said resistor, and a middle electrode connected to the second terminals of said condenser and said resistor.

3. Apparatus for testing circuit-interrupting devices comprising in combination, a supply circuit for current to be interrupted by an interrupting device under test, a surge generator, connections including a three-electrode spark gap between said generator and said circuit, means for producing a voltage proportional to the second derivative with respect to time of current in said supply circuit, and means for applying said voltage to the middle electrode of said three-electrode gap.

4. Apparatus for testing circuit-interrupting devices comprising in combination, a supply circuit for current to be interrupted by an interrupting device under test, said circuit including a pair of terminals for connection to an interrupting device under test, a surge generator connected to said terminals for applying a recovery voltage transient, said surge generator having a voltage responsive releasing means, means for producing a voltage proportional to the second derivative with respect to time of current in said supply circuit, and means for applying said voltage to the releasing means of said surge generator.

5. In combination, apparatus of the type in which current may be interrupted, a current supply circuit connected in series relation with said apparatus, means for producing a voltage proportional to the second derivative with respect to time of current flowing in said apparatus, a surge generator connected across said apparatus and having a voltage-responsive releasing member, and a connection between said voltage-producing means and said surge generator releasing member.

RAOUL WILLHEIM.
GERHARD FRÜHAUF.